W. E. BAKER AND W. F. SONNEMAN.
MACHINE FOR MANUFACTURING WIRE CAGES.
APPLICATION FILED SEPT. 4, 1920. RENEWED JUNE 24, 1922.

1,424,973.

Patented Aug. 8, 1922.

Inventors
William E. Baker
William F. Sonneman

By John M. Spellman
Attorney

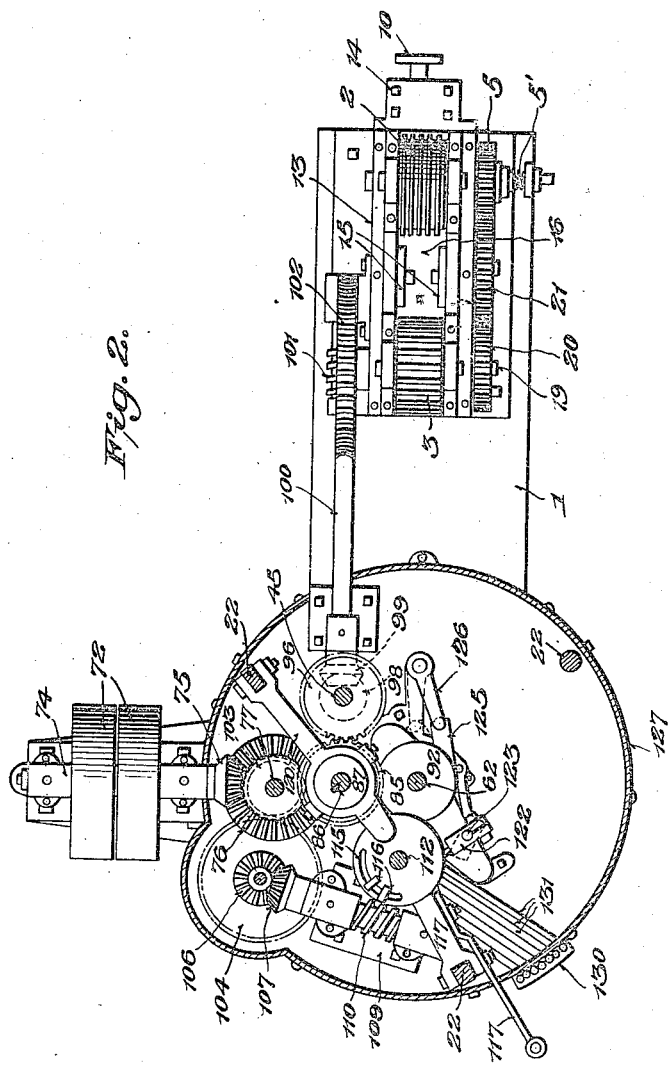

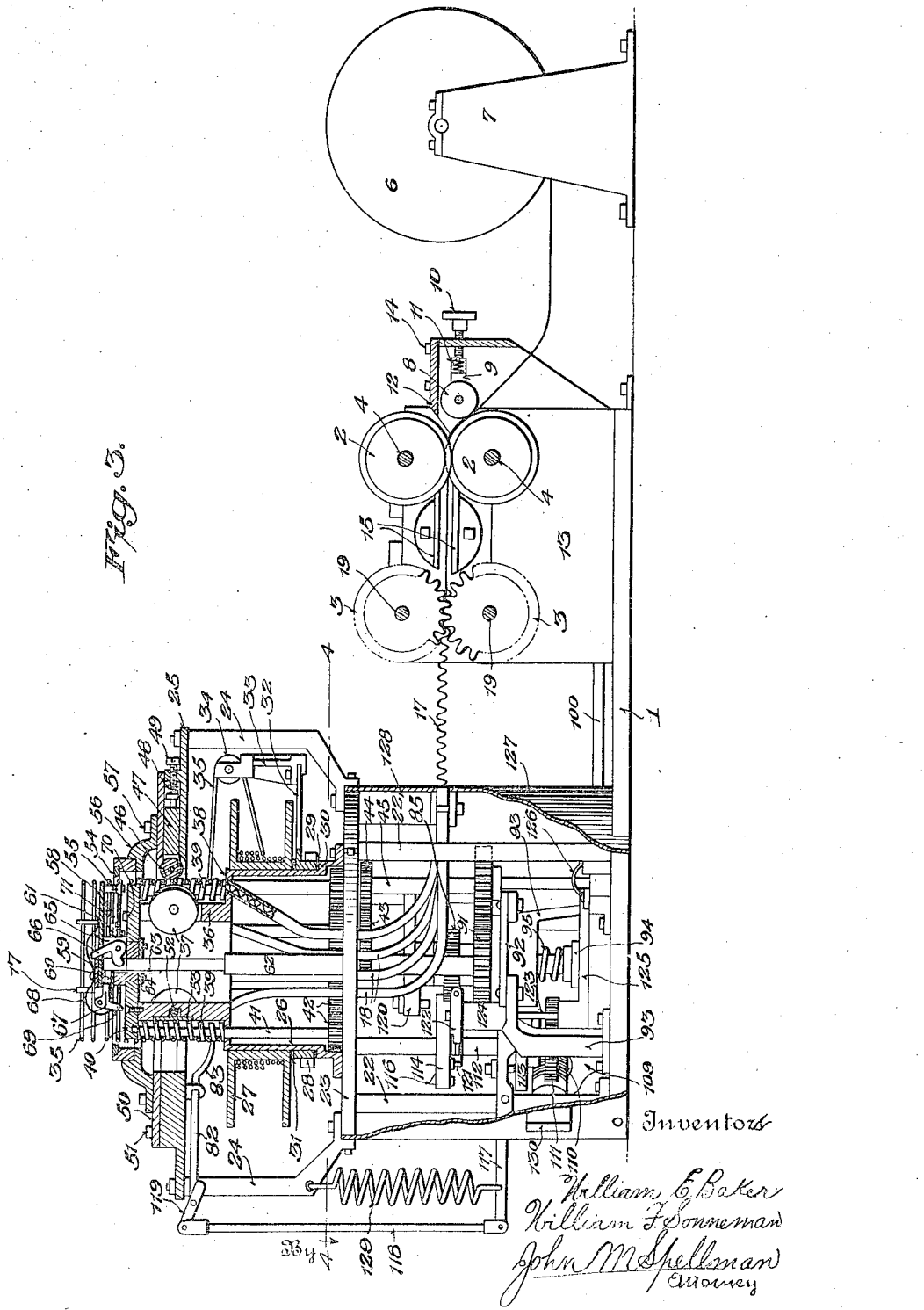

UNITED STATES PATENT OFFICE.

WILLIAM E. BAKER AND WILLIAM F. SONNEMAN, OF WACO, TEXAS, ASSIGNORS TO WONDER TRAP CO., INC., OF WACO, TEXAS.

MACHINE FOR MANUFACTURING WIRE CAGES.

1,424,973.          Specification of Letters Patent.     Patented Aug. 8, 1922.

Application filed September 4, 1920, Serial No. 408,218. Renewed June 24, 1922. Serial No. 570,717.

*To all whom it may concern:*

Be it known that we, WILLIAM E. BAKER and WILLIAM F. SONNEMAN, citizens of the United States, residing at Waco, in the county of McLennan and State of Texas, have invented certain new and useful Improvements in Machines for Manufacturing Wire Cages, of which the following is a specification.

This invention relates to certain new and useful improvements in a machine for manufacturing wire cages, especially those adapted for the manufacture of wire or metal baskets, bird cages and the like, and it has for its primary object to provide a machine which will be practically automatic, will require a minimum attention, and will be reliable and efficient in operation.

The invention further resides in a machine which will divide a sheet metal stock into stay-forming strips, arrange the strips in a predetermined relation and then apply a wire filler thereto.

Further, the invention resides in means for crimping or corrugating the stay-forming strips, seating the wire filler in the corrugations and then clinching the "hill" portions of the strips down over the wire to firmly secure the filler and stays together.

Further objects reside in the novel wire-applying mechanism, the stay-clinching mechanism, the cage-advancing means, the cage-severing means, the salient features of construction, and the arrangements and combinations of parts hereinafter described and claimed, reference being made to the accompanying drawings wherein:

Figure 2, is a plan view depicting the stay-producing mechanism at one end and the transmission gearing and operating mechanism at the opposite end of the machine, the latter mechanism being disposed beneath the cage-forming mechanism which has been removed from this view.

Figure 3, is a longitudinal vertical section through the machine with portions left in elevation.

Figure 1:
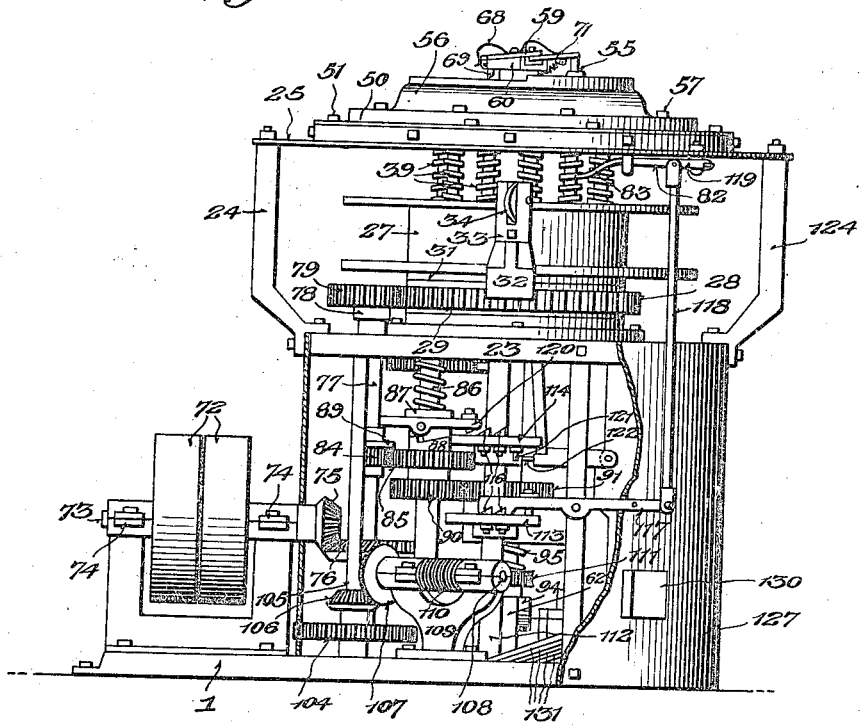
Figure 1, is an elevation of the improved machine as viewed looking toward the cage assembling or forming mechanism, a portion of the casing being removed.

Referring more in detail to the drawings, the numeral 1 designates the base of the frame structure on one end of which is arranged the stay-forming mechanism which includes the cutting and crimping or corrugating mechanism consisting of the coacting and relatively superposed cutters 2 and the likewise disposed and coacting corrugating rollers 3. Each cutter consists of a series of cutting disks fixed on a shaft 4 which carries a gear 5 connected thereto by friction clutch 5' and intermeshing with gear 5 of the companion cutter, the said cutters acting to sever or divide the sheet metal stock fed therebetween into a plurality of narrow strips or ribbons. The stock of sheet metal is fed from a supply roll 6, suitably mounted on standards 7, beneath a friction or guide roll 8, which is yieldably held against the lower cutter by means of the slidable roller-supporting frame 9, an adjusting screw 10 and an interposed cushioning spring 11. A guide frame 12 also aids in correctly feeding the sheet metal between the cutters by preventing the same from buckling, said frame housing the roller and being secured to the supporting structure or body 13 by screws 14. The cut strips are directed to the crimping rolls 3 from the cutters 2 by means of the interposed guides 15 secured to the opposite sides of the guideway or passage 16, and after pasing between the crimping rolls, by which they are corrugated, the corrugated or crimped strips 17 are guided through the flexible and tubular guides or conduits 18 to wire-applying mechanism. The shafts 19 which support the rolls 3 also carry on one end intermeshing gears 20, the same being connected to gears 5 by an interposed transmission gear 21.

The cage-forming mechanism or unit is mounted at the opposite end of the base on a superstructure supported off the base by legs 22 and comprises a platform 23 from which rise uprights 24 for supporting a ring-like top plate 25 spaced above the platform. Bolted or otherwise secured to the platform is a cylindrical casing 26 which constitutes a hub or stub shaft on which a wire-supplying spool or reel 27 is freely journaled and also an annular gear 28. A fixed brass wear ring 29 is seated on the shoulder 30, formed around the base of the casing 26, and on this wear ring or plate rotates the gear 28, while interposed between the gear and spool is interposed a second brass ring or wear plate 31. Fixed on the gear 28 is an outwardly extending radial arm 32 having a post 33 upstanding beyond the periphery of the wire spool and carrying at its upper end a guide sheave 34 over which the wire 35 takes to the cage formers. Obviously then, rotation of gear 28 will effect movement of the guide pulley 34 in an annuular path about the wire holding spool.

Figure 4:
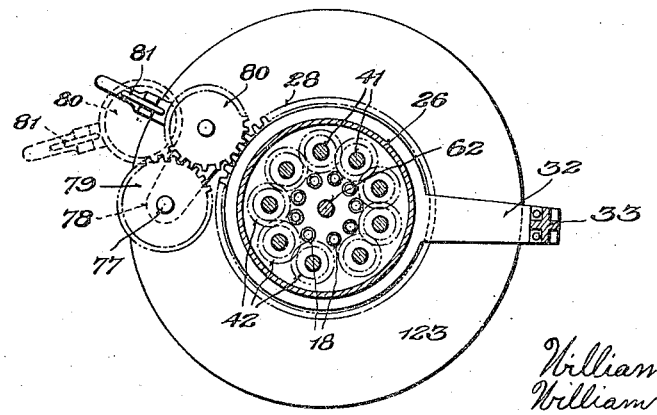
Figure 4, is a horizontal sectional view on line 4—4 of Figure 3, through the wire control at the base of the cage-forming mechanism.

The casing 26 is provided with a reduced upward extension 36 constituting a support for the inner set of clinching rollers 37 and providing an annular wall 38 at the juncture of the extension 36 and the casing proper. The wire-spacing and cage-advancing members are in the form of spirally grooved cage-formers or worms 39 which are arranged in a circular series about the extension or support 36 and have their upper ends journaled in a cap plate 40, secured to the upper end of said extension, while their lower ends terminate in shafts 41 that are journaled in the annular wall 38 and also the platform 23 and fixedly carry small gears 42 which are thus arranged inside the casing 26. One of the shafts 41 is extended through and below the platform and has a spur gear 43 fixed thereto for being driven by an intermeshing drive gear 44 fixed on the upper end of a shaft 45. The gears 42 all intermesh with one another so that the alternate wire-supporting and feeding worms are driven in opposite directions and for this reason are formed with reverse spirals. Thus, the reversely related spirals cooperate in the better holding the wire, the more uniform spacing of the successive strands, and the steadier and more regular advancing of the strands. The number of worms may vary depending upon the size of the cage to be formed and the number of stays or ribs, there being an equal number of stays and worms. Especially where the number of worms is an odd number two adjacent gears 42 are spaced out of meshing relation and to equalize the drive the two gears substantially diametrically opposite to the drive gear 44 are relatively spaced, as depicted in Figure 4.

Obviously rotation of the worms or spirals in a forward direction will advance the strands of wire along with the corrugated or crimped stays of sheet metal which are delivered between the worms by the guide tubes 18 in timed relation to receive the strands of wire in the successive corrugations. To secure the wire to the stays the successive bends in the latter are clinched or compressed down over the wire as they pass between the clinching or compressing rollers 37 and 46. The clinching rollers 46 are yieldably mounted, each being journaled in the bifurcated end of a slidable block or support 47 which is urged inwardly by a spring 48 and adjustable as to the degree of pressure by screw 49. The slidable blocks are disposed in radial pockets or compartments in the top plate 25 which are closed by a cover plate 50 secured thereto, as by means of bolts 51. The compressing and clinching rollers are disposed in cooperating pairs between the advancing worms and in alinement with the respective stay strips so that the latter will pass therebetween. The inner rollers 37 are arranged in vertical slots provided in the extension 36 and have their stub shafts 52 journal in bearings formed in the walls of the slots where they are retained by the straps 53. The rollers 37 and 46 compress the flexible sheet metal down across the strands of wire and securely clinch the stays and wire together, producing a light, well made, strong and durable cage comprising sheet metal stays or ribs, considered as the frame, and a filler or covering of wire, the whole secured together without any solder, riveting or striking out of cleats from the stock. The cage is especially designed for the manufacture of baskets, bird cages and fences, but is obviously not limited to such articles. While it has been specifically mentioned that the stays are of sheet metal and the filler of wire, it is not the intention to so limit the machine since the stays can be formed of wire and the filler of sheet metal, or both of wire or sheet metal. The terms "wire" and "sheet metal" are used as a convenience, therefore, and not as a specific limitation.

As the cage is advanced in its complete state over the cap plate 40, which serves as a guide therefor, and out through the top of the machine, the same is severed into predetermined lengths by means of a surrounding stationary blade 54 and a cooperating, interiorly arranged rotating cutter 55. The stationary cutter is supported on an annular support 56 secured to the cover plate 50 by screws 57, while the rotating cutter depends from the outer end of a slide 58 which telescopes in an inner casing 59 pivotally mounted at one end in a U-shaped arm 60. This arm is fixed on a hub 61 designed to be rotated by a centrally located, vertical shaft 62 to the upper end of which the hub is slidably connected as by feather 63. The hub is journaled in the cap plate 40, having a shoulder seating thereon and secured against upward displacement by a removable plate 64 engaging the under face of said cap plate. Pivoted in a slot 65 in the hub is a lever 66 of substantially bell-crank form, having one arm extending into the axial bore of the hub for engagement by the shaft 62 and the other arm extending through a slot formed in the slide 58 whereby the latter will be projected radially, upon vertical movement of the shaft, and thereby bring the cutter 55 into operative position for severing a length of the completed cage. The shaft is raised only momentarily or during a part of the revolution of the cutter, as will be hereafter explained, and in order to maintain the cutter operative throughout the remainder of the active travel of the cutter a dog 67 is pivoted to drop behind the slide 58 when the latter is projected, a spring 68 being secured to the casing 59 to assist in such operation. Upon completing the cutting operation, a cam projection 69, depending from the dog 67, rides upon a lug 70 upstanding from the cap plate 40 and thus releases the slide 58 to be retracted by a spring 71 anchored at its ends to said slide and the hub 61, respectively.

The transmission gearing derives its power from a suitable source (not shown) connected by a belt to the tight and loose pulleys 72, the latter being mounted on a shaft 73 which is journaled in the standard bearings 74 and fixedly carries a bevel gear 75 on its inner end for meshing with and driving a second bevel gear 76. This second gear has fixed support on a vertical shaft 77 which is journaled in the base 1 and the platform 23, the same projecting above the platform and to provide a pivot for a right angular lever 78 and a superposed gear 79, said gear being fixed to said shaft and in constant mesh with an idler gear 80 carried by said lever. The idler gear is adapted to function as a lower transmission between gears 79 and 28, and for this reason the gear 80 is swingingly mounted so that by swinging the lever 78 inwardly the gears may be intermeshed and by swinging the lever outwardly the gears may be disconnected. A latch 81 is pivoted on the outer end of lever 78 and designed to enter a keeper recess in the platform to lock the gears in meshing relation. Obviously, with the gears 80 and 28 meshing the wire-laying arm 32 will have a steady and uninterrupted movement about the cage formers. To assist in laying the wire cross strands in the successive grooves of the corrugated stays or ribs, a shaft 82 is journaled on the underside of the plate with its inner end deflected downwardly toward the cage formers to provide a wire-guiding or directing arm 83.

Fixed on the shaft 77 above bevel gear 76 is a spur gear 84 which meshes with a loose gear 85 rotatable on a vertical shaft 86, said shaft being journaled in the base and platform and having a clutch sleeve or part 87 slidable thereon and adapted to be moved lengthwise on the shaft into interlocking relation with a clutch face 88 carried by the gear 85. The latter is restrained from riding upwardly on shaft 86 by a flange 89 extending from a collar fixed on shaft 77 while downward sliding of said gear is prevented by an underlying gear 90 fixed on shaft 86. This last gear meshes with a gear 91 which is splined to shaft 62 and rests on table 92 that has supporting legs 93. Shaft 62 is journaled and slidable in the base, table and platform and carries a fixed cam 94 below the table and a coiled spring 95 intermediate the table and cam for urging the shaft down to its lowermost position. Gear 90 also meshes with another gear 96 fixed on vertical shaft 45 and carrying a bevel gear 98 which meshes with a like gear 99 on the adjacent end of a horizontal shaft 100, the same being journaled on the base and transmitting its power to the stay forming mechanism through worm gears 101 and 102. Gear 102 is fixed on a projecting end of one shaft 19 for driving the corrugating rolls and the cutters.

Beneath gear 76 is a fourth gear 103 fixed on shaft 77 and this gear meshes with a gear 104 on shaft 105 for driving a bevel gear 106 also on the shaft, said bevel gear driving a like gear 107 fixed on a horizontal shaft 108 that has journal bearings in a Y-shaped standard 109 on the base of the machine. Between its journal bearings the shaft 108 is equipped with a worm 110 having meshing relation with a worm gear 111 fixed on vertical shaft 112. Relatively spaced and superposed on this shaft is a pair of disks 113 and 114, each having an arcuate slot 115 near its periphery in which is adjustably mounted a plurality of cam pins or lugs 116 clamped in the desired position on the disks by such means as nuts as shown. The lower set of cam projections is designed to wipe under the inner end of a lever 117 which is pivoted on one of the legs or posts 22 and has its outer end connected by a link 118 to a rocker arm 119 fixed on the outer end of shaft 82. Thus, every revolution of disk 113 will lift the deflected arm 83 and thereby prevent the latter engaging the wire while wrapping the ends of cages. The link 118 is detachably connected to shaft 82 whereby the superstructure may be removed for replacing an empty spool with a full one.

The upper cam disk 114 is arranged to wipe beneath the inner end of a lever 120 which is pivoted at its opposite end to another post 22 and formed intermediately with a yoke for straddling and being connected to the clutch sleeve 87 so that as the cams on disk 114 elevate the inner end of said lever the sleeve will also be moved vertically on its supporting shaft to unclutch the gear 85 from said shaft 86. On the underside of disk 114 is a pin or lug 121 adapted to engage and wipe an arm 122 clamped on the upper end of a short vertical shaft 123, said shaft being journaled in a bearing 124 of table 92 and having its lower end fixed to a lever 125. Each rotation of disk 114 will effect oscillation of the arm 122 outwardly and this action will result in swinging the lever 125 inwardly in the path of cam 94 so that the latter will ride upon the lever 125 and thereby elevate the shaft 62 to throw the rotary cutter outwardly into operative position. A bow spring 126 is pivoted at one end and has its opposite end engaged under tension in a seat in the end of lever 125. The movement of the lever is from one side to the other of dead center so that after the lever has moved beyond dead center the spring will then function to swing the lever the remainder of its travel and there yieldably retain it. Immediately after the cutter has been shifted to operative position the cam 94, having an abutment, strikes the lever 125, and swings it outwardly beyond dead center so that the spring will function to carry it further outwardly, such action disposing the arm 122 again in the path of pin 121.

The operation of the machine may be briefly stated as follows:

The roll of sheet metal 6 is mounted on the standards 7 and a supply of wire provided on the spool 27. Being fed beneath guide roller 8 and between the cutters 2, the sheet metal is divided into a plurality of strips or ribbons (nine in the present instance) all of which are then passed between rollers 3 to receive the desired crimping or corrugating. From these rollers the corrugated, stay-forming strips are directed through the casing or inclosing wall 127 into the guide tubes the lower ends of which are supported in compact relation by a bracket 128 depending from the overlying platform. The strips are delivered by the tubes in circular arrangement between the cage formers and in line with the respective pairs of compressing and clinching rolls.

Gear 80 is then meshed with gear 28 for causing the wire-laying arm 32 to be rotated about the inwardly arranged corrugated stays. This operation effects laying of the wire strands in the successive corrugations of the stays and the grooves of the cage formers or strand carriers, the latter causing the strands of wire to advance and thereby pull the stays between the compressing and crimping rollers. The number of strands of wire in a complete cage is determined by the timing shaft 112 and the number of teeth in worm gear 111. In the present instance, the cutter is actuated once during every revolution of the timing shaft and serves to sever the cage in predetermined lengths, the fixed blade being set at an upward angle so that the cages can be cut off during the process of forming or constructing them. During the rotation of the timing shaft the upper cam disk disengages the clutch parts 87 and 88 to arrest rotation of the central shaft 62. The lower cam disk also functions to elevate lever 117 and lift the deflected, wire-guiding arm. Continued rotation of the upper cam disk effects oscillation of lever 125 inwardly so that the cam 94 will ride upon the same and thus elevate the central shaft to eject the cutter to operative position. The wire-guiding arm 83 is held in its normally operative position by a coiled spring 129 urging upwardly on the outer end of lever 117. Oil cups or chambers 130 are provided in the casing 127 for delivering the necessary lubricant to the several bearings through the instrumentality of ducts or tubes 131.

The entire mechanism is practically automatic and reliable in operation requiring a minimum amount of attention. The cages are easily shaped and constructed into various articles such as baskets, bird cages, fences and the like. The strands of wire are clinched to the stays or ribs without necessitating any cutting or striking out of portions thereof to produce cleats or the like; no solder is required the connection being effected by rolling down or compressing the projections of the ribs over across the wire, such operation producing a neat and secure joint.

While the foregoing detailed description has been given for the sake of clearness of understanding it is obviously not intended to so limit or confine the invention beyond the scope of the appended claims.

What is claimed:

1. In a cage forming machine, means for supplying a sheet of metal, means for dividing the sheet longitudinally into strips to form stays for the cage, and means for passing wire strands transversely of the stays and securing the same together.

2. In a cage forming machine, means for supplying a sheet of metal, means for dividing the sheet longitudinally into strips to form stays for the cage, means for forming the stays to receive a wire filler, and means for applying and fastening a wire filler to the stays.

3. In a cage forming machine, means for supplying a sheet of metal, means for dividing the sheet longitudinally into strips to form stays for the cage, means for crimping the strips, and means for interlocking a filler with the crimps of said strips.

4. In a cage forming machine, means for supplying a sheet of metal, means for dividing the sheet longitudinally into strips to form stays for the cage, means for crimping the strips, means for applying a filler to the strips, and means for clinching the crimps down over the filler to secure the latter to the strips.

5. In a cage forming machine, means for supplying a sheet of metal, means for dividing the sheet longitudinally into strips to form stays for the cage, means for crimping the strips, means for laying strands of wire in the successive crimps, and means for securing the wire and strips together.

6. In a cage forming machine, means for supplying a sheet of metal, means for dividing the sheet longitudinally into strips, to form stays for the cage, means for crimping the strips, means for laying strands of wire in the successive crimps, and means for compressing and clinching the crimps of the strips down over the wire to secure the same together.

7. In a cage forming machine, means for feeding corrugated stay forming strips, and means for successively laying a filler in the corrugations thereof and clinching the same therein by bending over the corrugations of the stay strips.

8. In a cage forming machine, means for feeding corrugated stay forming strips, means for coiling a filler about pre-arranged stays, and means for interlocking the filler with the corrugations by crimping the latter over the filler.

9. In a cage forming machine, means for feeding corrugated stay forming strips, means for arranging the strips to form a hollow body, and means for coiling a wire about the pre-arranged strips and engaging the same in the corrugations thereof, means engaged with the coils of wire to advance the co-related parts as a unit, and means for pressing the corrugations over onto the wire.

10. In a cage forming machine, means for feeding corrugated stay forming strips, means for arranging the strips to form a hollow body, means for coiling a wire about the pre-arranged strips and engaging the same in the corrugations thereof, and means for bending the corrugations down over the wire.

11. In a cage forming machine, means for feeding corrugated stay forming strips, means for arranging the strips to form a hollow body, means for coiling a wire about the pre-arranged strips and engaging the same in the corrugations thereof, and means for compressing the projections of the strips between each strand of wire over the latter to secure the wire to the strips.

12. In a cage forming machine, means for feeding corrugated stays, means for laying cross strands in the grooves of said stays, and means for clinching the cross strands in the stay grooves by pressing portions of the stays thereover.

13. In a cage forming machine, means for dividing a strip of sheet material into a series of stays, means for forming seats in the stays to receive cross strands, and means for laying the cross strands in the seats of said stays.

14. In a cage forming machine, means for dividing a strip of sheet material into a series of stays, means for corrugating the stays, means for guiding the stays into cage formation, and means for laying cross strands in the corrugations of the stays.

15. In a fabric forming machine, means for advancing stays in pre-arranged form and with preformed seats for cross strands, means for laying cross strands in the seats of said stays and holding them therein during advancing movement thereof, and means for crimping the stays over the cross strands and thereby shortening the stays by and during continued advancing movement.

16. In a cage-forming machine, means for arranging a series of corrugated stays in predetermined relation, means for laying cross strands in the corrugations, spirally grooved rotatable members arranged between the stays for receiving the cross strands to advance them along with the stays, and means for connecting the latter to the cross strands.

17. In a cage-forming machine, means for arranging a series of corrugated stays in predetermined relation, means for laying cross strands in the corrugations, spirally grooved rotatable members arranged between the stays for receiving the cross strands to advance them along with the stays, and a pair of cooperating rollers acting upon each stay for compressing the raised portions thereof over the cross strands to connect the two together.

18. In a cage-forming machine, means for arranging a series of corrugated stays in predetermined relation, means for laying cross strands in the corrugations, spirally grooved rotatable members arranged between the stays for receiving the cross strands to advance them along with the stays, means for connecting the latter to the cross strands, means for rotating the rotatable members to advance the completed fabric, and means timed relative to said last means for severing the fabric into predetermined lengths.

19. In a cage forming machine, stay-forming means comprising a pair of rotary coacting cutters for dividing a ribbon of sheet metal into a plurality of stay-forming strips, and means for providing cross-strand-securing projections on the strips.

20. In a cage forming machine, stay-forming means comprising a pair of rotary coacting cutters for dividing a ribbon of sheet metal into a plurality of stay-forming strips, and means for corrugating the strips to receive cross strands for securement thereto.

21. In a cage forming machine, stay-forming means comprising a pair of rotary coacting cutters for dividing a ribbon of sheet metal into a plurality of stay-forming strips, a pair of cooperating corrugating rolls between which the divided strips are fed, and means for guiding the strips from the cutters to the rolls.

22. In a cage forming machine, stay-forming means comprising a pair of rotary coacting cutters for dividing a ribbon of sheet metal into a plurality of stay-forming strips, a pair of cooperating corrugating rolls between which the divided strips are fed, and means for applying and securing a wire filler to the corrugated stays.

23. In a cage forming machine, stay-forming means comprising a pair of rotary coacting cutters for dividing a ribbon of sheet metal into a plurality of stay-forming strips, a pair of cooperating corrugating rolls between which the divided strips are fed, means for guiding the several corrugated stays into predetermined relation, and means for applying cross strands transversely of the arranged stays.

24. In a cage forming machine, stay-forming means comprising a pair of rotary coacting cutters for dividing a ribbon of sheet metal into a plurality of stay-forming strips, a pair of cooperating corrugating rolls between which the divided strips are fed, means for guiding the several corrugated stays into predetermined relation, means for applying a wire filler to the stays, and means for clutching the stays to the filler.

25. In a cage-forming machine, a plurality of worm members arranged side by side with the alternate ones having their spiral grooves extending reversely, and means for rotating the members with the alternate ones being reversely rotated.

26. In a cage-forming machine, reversely-operating worm members for spacing and advancing successive cross strands, and means for laying wire strands in the grooves of said members.

27. In a cage-forming machine, reversely-operating worm members for spacing and advancing successive cross strands, means for feeding stays lengthwise between the members, and means for laying cross strands in the grooves of said members and across the stays for connection therewith.

28. In a cage-forming machine, reversely-operating worm members for spacing and advancing successive cross strands, means for feeding stays lengthwise between the members, means for laying cross strands in the grooves of said members and across the stays for connection therewith.

29. In a cage-forming machine, reversely-operating worm members for spacing and advancing successive cross strands, means for feeding corrugated stays between the members in the direction of advance, and means for laying the cross strands in the grooves of the members and stays.

30. In a cage-forming machine, reversely-operating worm members for spacing and advancing successive cross strands, means for feeding corrugated stays between the members in the direction of advance, means for laying the cross strands in the grooves of the members and stays, and means for compressing the raised portions of the stays over onto the cross strands for securing the stays thereto.

31. In a cage-forming machine, reversely-operating worm members for spacing and advancing successive cross strands, means for feeding corrugated stays between the members in the direction of advance, means for laying the cross strands in the grooves of the members and stays, and cooperating pairs of compressing rollers between which the stays are advanced for clinching the same to the cross strands.

32. In a cage-forming machine, reversely-operating worm members for spacing and advancing successive cross strands, means for feeding corrugated stays between the members in the direction of advance, means for laying the cross strands in the grooves of the members and stays, means for compressing the raised portions of the stays over onto the cross strands for securing the stays thereto, and means for severing the completed cage into predetermined lengths.

33. In a cage-forming machine, reversely-operating worm members for spacing and advancing successive cross strands, means for feeding corrugated stays between the members in the direction of advance, means for laying the cross strands in the grooves of the members and stays, means for compressing the raised portions of the stays over onto the cross strands for securing the stays thereto, and means for severing the completed cage into predetermined lengths, comprising an exteriorly arranged fixed cutter and a cooperating interiorly arranged movable cutter.

34. In a cage-forming machine, reversely-operating worm members for spacing and advancing successive cross strands, means for feeding corrugated stays between the members in the direction of advance, means for laying the cross strands in the grooves of the members and stays, means for compressing the raised portions of the stays over onto the cross strands for securing the stays thereto, and means for severing the completed cage into predetermined lengths, comprising an exteriorly arranged fixed cutter and a cooperating interiorly arranged movable cutter, means for rendering the movable cutter operative including a slidable shaft geared to rotate in timed relation with the worm member drive, and means for shifting the shaft at intervals to effect operation of the movable cutter.

35. In a cage-forming machine, an annular fixed cutter, a cooperating movable cutter, a shaft slidably supporting the movable cutter, and means for rendering the movable cutter operative.

36. In a cage-forming machine, an annular fixed cutter, a cooperating movable cutter, a slidably mounted rotary shaft, a hub splined thereon, means slidably supporting the movable cutter on the hub, and means operable by the shaft during its sliding movement for sliding the movable cutter to its operative position.

37. In a cage forming machine, means for dividing a sheet of metal into strips, means for supplying said strips to form stays for the cage, and means for coiling a wire about the strips and fastening the same in a manner to form cross strands for the cage.

38. In a fabric forming machine, a plurality of carriers, means for advancing stays in prearranged form between the carriers and with preformed seats for cross strands, means for laying cross strands in the carriers and means for forcing the stays into interlocking relation with said cross strands during the advancing movement thereof.

39. In a cage forming machine, a plurality of carriers having seats, means for arranging stays in a definite form between the carriers, a strand-laying member designed for encircling the prearranged stays for laying a wire thereabout and in the seats of the carrier, and means for securing the wire strands to the stays.

40. A cage forming machine comprising a supporting frame, a plurality of conduits terminating in a predetermined arrangement, means for longitudinally dividing a ribbon of metal into a plurality of strips for being fed through the conduits to provide predeterminedly arranged strands, and means for laying and affixing strands in the seats.

41. A cage forming machine comprising means for dividing sheet metal stock into stay-forming strips, conducting tubes for guiding the strips into a predetermined arrangement, a rotary strand-laying device movable in a path encircling the pre-arranged strips, and means for attaching the laid strands to the latter.

42. A cage forming machine comprising means for supporting stays in predetermined relation, an encircling strand-laying member for coiling wire strands thereabout, strand-spacing members having seats for supporting the laid strands, and means for attaching the stays to the strands.

43. A cage forming machine comprising means for supporting stays in predetermined relation, an encircling strand-laying member for coiling wire strands thereabout, strand-spacing members for supporting the laid strands and advancing them prior and subsequent to attachment to the stays, and means for securing the stays and strands together.

44. A cage forming machine comprising a frame, a wire reel journaled thereon, an upward extension from the frame above the reel, spiral strand-conveyors and spacers mounted on the extension in predetermined arrangement, a strand-laying member journaled on the frame for encircling the spacers and laying a wire from the reel thereabout to form strands, means for feeding stays between the spacers, and means for attaching the stays to the coiled strands.

45. A cage forming machine comprising a frame, a wire reel journaled thereon, an upward extension from the frame above the reel, spiral strand-conveyors and spacers mounted on the extension in predetermined arrangement, a strand-laying member journaled on the frame for encircling the spacers and laying a wire from the reel thereabout to form strands, means for feeding stays between the spacers, and means for forcing the stays strands into positive interlocking relation.

46. A cage forming machine comprising a frame, a wire reel journaled thereon, an upward extension from the frame above the reel, spiral strand-conveyors and spacers mounted on the extension in predetermined arrangement, a strand-laying member journaled on the frame for encircling the spacers and laying a wire from the reel thereabout to form strands, means for feeding stays between the spacers, means for forcing the stays strands into positive interlocking relation, and means for guiding the coiled strands into successive grooves of the spacers as the strand-laying member commences each succeeding revolution.

47. A cage forming machine comprising a frame, a wire reel journaled thereon, an upward extension from the frame above the reel, spiral strand-conveyors and spacers mounted on the extension in predetermined arrangement, a strand-laying member journaled on the frame for encircling the spacers and laying a wire from the reel thereabout to form strands, means for feeding stays between the spacers, means for forcing the stay strands into positive interlocking relation, means for guiding the successive coils of the strands into successive grooves of the spaces and means operating automatically to render the coil guiding means inoperative at predetermined intervals.

48. A cage forming machine comprising a frame, a wire reel journaled thereon, an upward extension from the frame above the reel, spiral strands-conveyors and spacers mounted on the extension in predetermined arrangement, a strand-laying member journaled on the frame for encircling the spacers and laying a wire from the reel thereabout to form strands, means for feeding stays between the spacers, means for securing the stays and strands together, and means for rendering the strand-laying member inoperative.

In testimony whereof we have signed our names to this specification.

WILLIAM E. BAKER.
WILLIAM F. SONNEMAN.